Patented Sept. 26, 1939

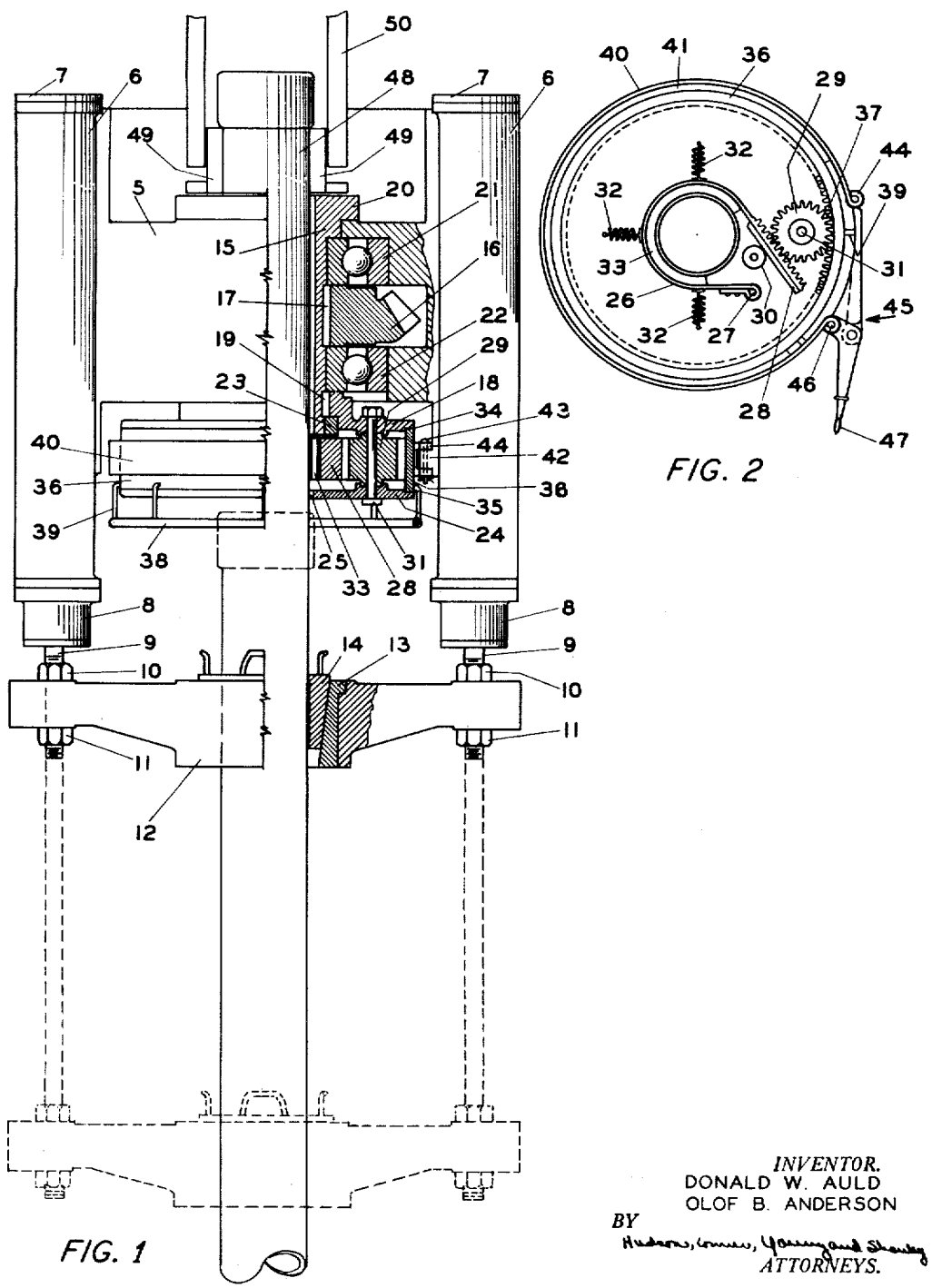

2,174,115

UNITED STATES PATENT OFFICE 2,174,115

TUBING MAKE-UP DEVICE

Donald W. Auld, Bartlesville, Okla., and Olof B. Anderson, Marquette, Mich.; said Auld assignor to Phillips Petroleum Company, a corporation of Delaware, and said Anderson assignor to E. J. Longyear Company, a corporation of Delaware Application September 27, 1937, Serial No. 165,974

7 Claims. (Cl. 255—19)

This invention relates to an improved device for making up tubing in wells.

An important object of the invention is to provide a device which will expedite the process of making joints in tubing for well holes.

An additional important object of the invention is to provide a device for making up tubing without the use of supplemental tools, such as tongs.

A further important object of the invention is to provide a portable rotary drilling machine with apparatus for making up tubing.

A still further important object of the present invention is to provide a device in which rotary power can be applied to a joint to make the same without danger of damaging the threads of the joint or overloading the prime mover.

In the accompanying drawing, forming a part of this specification and in which like numerals are applied to designate like parts throughout the same, Figure 1 is a view partly in elevation and partly in section of a device embodying the invention, and Figure 2 is a plan view of plate 24 and its associated structure.

In the drawing wherein for the purpose of illustration, is shown a preferred embodiment of the invention, the numeral 5 indicates a supporting member carrying two hydraulic cylinders 6, 6, having cylinder heads 7, 7, at one end and stuffing boxes 8, 8, at the other, sealingly engaging piston rods 9, 9. Fixed to the free end of piston rods 9, 9, by nuts 10, 10, and 11, 11, is crosshead 12 having a centrally disposed opening receive spider 13 and spider slips 14. Also carried by supporting member 5 is a rotary table comprising sleeve or drive quill 15 having keyed thereto a main drive bevel quill gear 16 through key and keyway 17, and a plate 18 through key and keyway 19. Drive quill 15 bears on supporting member 5 through annular projection 20. It is to be understood that no vertical thrust is imposed on the rotary table so that the bearing at 20 merely maintains the weight of the table. The drive quill 15 is supported against lateral thrust above and below main drive gear 16 by ball bearings 21, 22 respectively. The assembly of bearings 21, 22 main drive gear 16, and plate 18 is maintained on drive quill 15 by lock nut 23 at the lower extremity of the drive quill.

The table also includes lower plate 24 fastened in spaced relation and in any desirable manner to plate 18. Plate 24 has an opening 25 in alignment with the grief stem passage in drive quill 15. Mounted on lower plate 24 is a brake band 26 fastened at one end of a pin 27 fixed in the plate. (See Figure 2). The brake band surrounds opening 25 and terminates in a gear rack 28 which in turn engages pinion gear 29 being held in engagement therewith by idler roller 30. Pinion gear 29 is rotatably mounted on plates 18 and 24 by pin 31. Springs 32 tend to maintain the brake band 26 centered with respect to opening 25. A brake lining 33 is shown on brake band 26. On the inside peripheral edge of each of plates 18 and 24 there are located continuous channels 34, 35 respectively which receive a continuous brake drum shell 36 in slidable engagement therewith. The interior of brake drum shell 36 in the neighborhood of pinion gear 29 has a section of gear teeth 37 which engages with pinion gear 29. A continuous hand rail 38 is attached to drum shell 36 by spacing spokes 39.

A stationary brake band 40 having a lining 41 is attached to lug 42 on support member 5 by a pin 43 and loops 44 on brake band 40. Brake band 40 has included in it a toggle joint designated generally at 45, one end of which is connected to lug 42 on support member 5 and the other end to loops 46 on the opposite end of brake band 40. A handle 47 is furnished to work the toggle joint 45 to tighten brake band 40 on brake drum shell 36.

A section of tubing 48 is shown passing through drive quill 15 and engaged by spider slips 14. Tubing section 48 is suspended from clamps 49 of elevator 50.

In operation, considering that elevator 50 has lowered tubing section 48 to the position shown in solid lines in Figure 1, spider slips 14 will then support the tubing section and elevator 50 can be unclamped to pick up a second section of tubing. In the meantime cross head 12 is lowered by means of hydraulic cylinders 6, 6 to the position shown by the dotted lines in Figure 1. Since tubing section 48 is now carried entirely by spider 13 and spider slips 14 the collar assumes the position shown by the dotted lines in Figure 1 below the plate 24. The second section of tubing held by the elevator is lowered through drive quill 15 until its threads are in alignment with the collar of tubing section 48. The rotary table can be started at this point or if desired can be run continuously. The direction of rotation in the embodiment shown would be clockwise. By operating handle 47 brake band 40 can be tightened on brake drum shell 36. Brake drum shell 36 had up to this point been rotating with plates 18 and 24 which, as mentioned above, are carried by drive quill 15. The tightening action of brake band 40 on brake drum shell 36 tends to stop brake drum shell 36 from rotating. This causes gear section 37 to move relative to plates 18 and 24 since it is decelerating while the plates continue to rotate at a fixed speed. Pinion gear 29 which is fixed by pin 31 with respect to plates 18 and 24 is thus turned around pin 31 by the section of gear section 37 in a clockwise direction. The motion of pinion 29 is transmitted to gear rack 28, tightening brake band 26 on the second tubing section. This action starts the second tubing section rotating in a clockwise direction and since tubing section 48 is held stationary by spider slip 14 the joint is made. It will be apparent that despite the braking action of brake band 40 on brake drum shell 36 the latter will continue to rotate at the same speed as the rotary table after rack 28 has tightened up brake band 26 to such a point that the braking forces balance. The brake band lining 41 then drags upon the brake drum shell 36 during the making of the joint. When the joint is made the pressure of brake band 40 is removed by the operation of handle 47 and if properly operated will be at the time the brake lining 33 begins to drag upon the second section of tubing due to the fact that the joint has become tight. Upon release of the pressure of brake band 40 on brake drum shell 36 springs 32 will back brake lining 33 off the tubing section. Spider slips 14 will be released and the elevator will lower the second tubing section to the position occupied by tubing section 48 as shown in solid lines in Figure 1. Spider slips 14 will again be inserted and the cycle repeated.

Although springs 32 in their functioning to center the brake band 26 tend to remove brake lining 33 from contact with the tubing section, they do not back off brake lining 33 far enough to allow the collar of the tubing to pass therethrough. To accomplish this is the function of hand rail 38. Since hand rail 38 is attached to brake drum shell 36, when brake band 40 is not tightened so as to decelerate brake drum shell 36, the latter rotates as is stated above with the plates 18 and 24 and the drive quill 15. Since decelerating brake drum shell 36 tightens brake band 26 upon the tubing section as explained above, it is apparent that acceleration of drum 36 with respect to plates 18 and 24 will back off brake band 26. Thus with the table rotating clockwise the operator merely grasps hand rail 38 and accelerates it in a clockwise direction to allow the tubing section collar to pass the brake lining 33.

It will be understood by those skilled in the art that the present device is convertible into a rotary drilling apparatus by merely substituting a chuck for spider 13 and spider slips 14 and providing slips in the drive quill to hold the kelly or grief stem.

Throughout this specification the term tubing is intended to include casing, drill pipe and sucker rods, to all of which the adaptability of the apparatus is apparent.

It is to be understood that the form of our invention, herewith shown and described is to be taken as a preferred example of the same and that various changes in the shape, size, and arrangement of parts may be resorted to without departing from the spirit of our invention and further that the theories of operation set out, although believed to be accurate are not to be considered as the sole basis of the operativeness of our device but that our device does operate successfully whether or not upon the principles described herein, our invention to be limited solely by the appended claims.

We claim:

1. In a tubing make-up device, a supporting member, a rotary table mounted on said supporting member, an opening centrally disposed in said table to receive a section of tubing, a spider supported by said supporting member for movement toward and away from the same in a substantially vertical direction, an opening in said spider for receiving a section of tubing, means carried by said spider for engagement with a said section of tubing, a brake element on said table arranged for engagement with a said section of tubing, a drum slidably mounted on said table, a gear section on said drum, a pinion gear on said table having engagement with said gear section, a rack on said table having engagement with said pinion gear, said rack being connected to said brake element, and a brake element on said support arranged for engagement with said drum.

2. In a tubing make-up device, a supporting member, a rotary table mounted on said supporting member, an opening centrally disposed in said table to receive a section of tubing, a spider supported by said supporting member for movement toward and away from the same in a substantially vertical direction, an opening in said spider for receiving a section of tubing, means carried by said spider for engagement with a said section of tubing, a brake element on said table arranged for engagement with a said section of tubing, one end of said brake element being fixed to said table, a rack connected to the other end of said brake element, a drum slidably mounted on said table, a gear section on said drum, a pinion gear rotatably mounted on said table for engagement with both said rack and said gear section, and means for moving said drum relative to said table.

3. A rotary table structure comprising a plate having an opening for a section of tubing, a brake element mounted on said plate for engagement with a said section of tubing, a drum slidably mounted on said plate, a connection between said brake element and said drum, whereby movement of said drum relative to said plate will operate said brake.

4. A rotary table structure comprising a plate having an opening for a section of tubing, a brake element mounted on said plate for engagement with a said section of tubing, a rack connected to said brake for operating the same, a drum slidably mounted on said plate, a gear section on said drum, gear means connecting said rack and said gear section, whereby movement of said drum relative to said plate will move said rack to operate said brake.

5. A rotary table structure comprising a plate having an opening for a section of tubing, a brake element mounted on said plate for engagement with a said section of tubing, a rack connected to said brake for operating the same, a drum slidably mounted on said plate, a gear section on said drum, a pinion gear rotatably mounted on said plate and engaging said gear section and said rack.

6. In a tubing make-up device, means for holding a section of tubing against rotation, means for holding a second section of tubing in alignment with the first said section of tubing and rotatable with respect thereto comprising a rotatable element having friction elements for engagement with or disengagement for said second section, a drum slidably mounted on said rotatable element, gear means connecting the friction elements and slidable drum, and a brake means engageable with the sliding drum to engage or disengage the friction elements from the second section of tubing.

7. In a tubing make-up device, a supporting member, a rotary table mounted on said supporting member, an opening centrally disposed in said table to receive a section of tubing, means for holding a second section of tubing against rotation and in alignment with the first said section of tubing, a brake element on said table arranged for engagement with the first said section of tubing, a drum slidably mounted on said table, a gear section on said drum, a pinion gear on said table having engagement with said gear section, a rack on said table having engagement with said pinion gear, said rack being connected to said brake element and a brake element on said support arranged for engagement with said drum.

DONALD W. AULD.
OLOF B. ANDERSON.

CERTIFICATE OF CORRECTION.

Patent No. 2,174,115. September 26, 1939.

DONALD W. AULD, ET AL.

It is hereby certified that error appears in the printed specification of the above numbered patent requiring correction as follows: Page 1, first column, line 12, for the word "tuning" read tubing; page 2, first column, line 8-9, for the word "section" read action; and that the said Letters Patent should be read with this correction therein that the same may conform to the record of the case in the Patent Office.

Signed and sealed this 21st day of November, A. D. 1939.

(Seal)

Henry Van Arsdale,
Acting Commissioner of Patents.

tatable element having friction elements for engagement with or disengagement for said second section, a drum slidably mounted on said rotatable element, gear means connecting the friction elements and slidable drum, and a brake means engageable with the sliding drum to engage or disengage the friction elements from the second section of tubing.

7. In a tubing make-up device, a supporting member, a rotary table mounted on said supporting member, an opening centrally disposed in said table to receive a section of tubing, means for holding a second section of tubing against rotation and in alignment with the first said section of tubing, a brake element on said table arranged for engagement with the first said section of tubing, a drum slidably mounted on said table, a gear section on said drum, a pinion gear on said table having engagement with said gear section, a rack on said table having engagement with said pinion gear, said rack being connected to said brake element and a brake element on said support arranged for engagement with said drum.

DONALD W. AULD.
OLOF B. ANDERSON.

CERTIFICATE OF CORRECTION.

Patent No. 2,174,115.     September 26, 1939.

DONALD W. AULD, ET AL.

It is hereby certified that error appears in the printed specification of the above numbered patent requiring correction as follows: Page 1, first column, line 12, for the word "tuning" read tubing; page 2, first column, line 8-9, for the word "section" read action; and that the said Letters Patent should be read with this correction therein that the same may conform to the record of the case in the Patent Office.

Signed and sealed this 21st day of November, A. D. 1939.

(Seal)     Henry Van Arsdale,
Acting Commissioner of Patents.